US011848929B2

(12) United States Patent
Götze et al.

(10) Patent No.: US 11,848,929 B2
(45) Date of Patent: Dec. 19, 2023

(54) IMEI STORAGE

(71) Applicant: GIESECKE+DEVRIENT MOBILE SECURITY GMBH, Munich (DE)

(72) Inventors: Frank Götze, Munich (DE); Claus Dietze, Obersochering (DE); Jan Eichholz, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 212 days.

(21) Appl. No.: 17/125,327

(22) Filed: Dec. 17, 2020

(65) Prior Publication Data

US 2021/0105273 A1 Apr. 8, 2021

Related U.S. Application Data

(63) Continuation of application No. 16/095,099, filed as application No. PCT/EP2017/000485 on Apr. 13, 2017, now Pat. No. 10,979,429.

(30) Foreign Application Priority Data

Apr. 19, 2016 (DE) .................... 10 2016 004 735.6

(51) Int. Cl.
*H04L 9/40* (2022.01)
*H04W 12/06* (2021.01)
*H04W 8/18* (2009.01)
*H04W 12/71* (2021.01)

(52) U.S. Cl.
CPC ......... *H04L 63/0876* (2013.01); *H04W 8/183* (2013.01); *H04W 12/06* (2013.01); *H04L 63/0428* (2013.01); *H04W 12/71* (2021.01)

(58) Field of Classification Search
CPC ..... G06F 21/44–445; G06F 21/60–604; G06F 21/78–805; H04L 9/0877; H04L 63/0876; H04W 8/183; H04W 12/004; H04W 12/00409; H04W 12/04071;
(Continued)

(56) References Cited

U.S. PATENT DOCUMENTS

| 7,103,782 B1 | 9/2006 | Tugenberg et al. |
| 9,471,793 B2 | 10/2016 | Gail et al. |
| 2002/0184512 A1 | 12/2002 | Cardoso, Jr. |

(Continued)

FOREIGN PATENT DOCUMENTS

| CN | 102083055 A | 6/2011 |
| DE | 102013114953 A1 | 7/2014 |

(Continued)

OTHER PUBLICATIONS

German Office Action from DE Application No. 102016004735.6, dated Jan. 26, 2017.
(Continued)

*Primary Examiner* — Kevin Bechtel
(74) *Attorney, Agent, or Firm* — WORKMAN NYDEGGER

(57) ABSTRACT

A chip set for a terminal comprises at least one secure processor, in which a one-time programmable memory is integrated. At least one terminal serial number of the terminal is stored in the chip set. Information for securing the terminal serial number against tampering is stored in the one-time programmable memory.

20 Claims, 1 Drawing Sheet

(58) Field of Classification Search
CPC ..... H04W 12/06; H04W 12/08; H04W 12/12; H04W 12/1206; H04W 12/71
See application file for complete search history.

(56) References Cited

U.S. PATENT DOCUMENTS

| | | | |
|---|---|---|---|
| 2005/0034116 A1* | 2/2005 | Rodriguez | G06F 21/10 |
| | | | 717/174 |
| 2006/0236111 A1 | 10/2006 | Bodensjö et al. | |
| 2007/0050622 A1* | 3/2007 | Rager | G06F 21/445 |
| | | | 713/168 |
| 2010/0180130 A1 | 7/2010 | Stahl et al. | |
| 2010/0299748 A1 | 11/2010 | Johansson et al. | |
| 2012/0011345 A1 | 1/2012 | Robertson et al. | |
| 2012/0309377 A1* | 12/2012 | De Atley | H04W 8/245 |
| | | | 455/418 |
| 2013/0019110 A1 | 1/2013 | Lee et al. | |
| 2013/0145080 A1 | 6/2013 | Grandin | |
| 2014/0223569 A1 | 8/2014 | Gail et al. | |
| 2014/0351835 A1 | 11/2014 | Orlowski | |
| 2015/0229654 A1 | 8/2015 | Perier | |
| 2015/0373778 A1 | 12/2015 | Holtmanns et al. | |

FOREIGN PATENT DOCUMENTS

| | | |
|---|---|---|
| EP | 2829978 A1 | 1/2015 |
| WO | 2014134829 A1 | 9/2014 |

OTHER PUBLICATIONS

International Search Report and Written Opinion from PCT Application No. PCT/EP2017/000485, dated Jul. 6, 2017.
"Digital Cellular Telecommunications System (Phase 2+); Universal Mobile Telecommunications System (UMTS); LTE; International Mobile Equipment Identities (IMEI) (3GPP TS 22.016 Version 10.0.0 Release 10)," ETSI TS 122 016, Version 10.0.0, May 2011, 10 Pages.
"Proposal For ISO/IEC 7816-12: Identification Cards—Integrated Circuit(s) Cards with Contacts—Part 12: USB Electrical Interface and Operating Procedure," ISO/IEC JTC 1/SC 17/WG 4 N 1605, Nov. 19, 2001, 4 Pages.
"Identification Cards—Integrated Circuit(s) Cards with Contacts—Part 1: Physical Characteristics, Amendment 1: Maximum Height of the IC Contact Surface," ISO/IEC 7816-1: 1998 / Amd. 1, 1998, 2 Pages.
"Identification Cards—Integrated Circuit(s) Cards with Contacts—Part 2: Dimensions and Locations of the Contacts, Amendment 1: Assignment of Contacts C4 and C8," ISO/IEC 7816-2:2002/FPDAM 1, Jul. 31, 2002, 8 Pages.
"Identification Cards—Integrated Circuit(s) Cards with Contacts—Part 3: Electronic Signals and Transmission Protocols, Amendment 1: Electrical Characteristics and Class Indication for Integrated Circuit(s) Cards Operating at 5 V, 3 V, and 1, 8 V," ISO/IEC 7816-3:2001/FDAM 1: 2001 (E), Sep. 28, 2001, 10 Pages.
"Information Technology—Identification Cards—Integrated Circuit(s) Cards with Contacts—Part 3: Electronic Signals and Transmission Protocols," ISO/IEC CD 7816-3, Apr. 1, 2003, 56 Pages.
"Information Technology—Identification Cards—Integrated Circuit(s) Cards with Contacts—Part 3: Electronic Signals and Transmission Protocols," ISO/IEC 7816-3, Second Edition, Sep. 18, 1997, 31 Pages.
"Proposed Amendment for ISO/IEC 7816-3: 1997 USB Interface for ICCs with Contacts," ISO/IEC 7816, Sep. 14, 2001, 5 Pages.
"Information Technology—Identification Cards—Integrated Circuit(s) Cards with Contacts—Part 3: Electronic Signals and Transmission Protocols, Amendment 2: Structures and Transmission of APDU Messages," ISO/IEC 7816-3: 1997/PDAM-2, Jan. 4, 2002, 16 Pages.
"Information Technology—Identification Cards—Integrated Circuit(s) Cards with Contacts—Part 4: Interindustry Commands for Interchange, Amendment 1: Impact of Secure Messaging on the Structures of APDU Messages," ISO/IEC 7816-4, Aug. 25, 1997, 9 Pages.
"Identification Cards—Integrated Circuit Cards—Part 4: Organization, Security and Commands for Interchange," ISO/IEC FCD 7816-4.2, Sep. 26, 2003, 89 Pages.
"Identification Cards—Integrated Circuit(s) Cards with Contacts—Part 5: Numbering System and Registration Procedure for Application Identifiers," ISO/IEC 7816-5, Jun. 15, 1994, 12 Pages.
"Identification Cards—Integrated Circuit(s) Cards with Contacts—Part 6: Interindustry Data Elements Amendment 1: IC Manufacturer Registration," ISO/IEC F-P/DAM 7816-6, 1998, 8 Pages.
"Identification Cards—Integrated Circuit Cards with Contacts—Part 6: Interindustry Data Elements for Interchange," ISO/IEC FDIS 7816-6: 2003 (E), Jul. 18, 2003, 26 Pages.
"Information Technology—Identification Cards—Integrated Circuit(s) Cards with Contacts—Part 7: Interindustry Commands for Structured Card Query Language (SCQL)," ISO/IEC 7816-7, Feb. 1, 1997, 29 Pages.
"Identification Cards—Integrated Circuit(s) Cards with Contacts—Part 8: Security Related Interindustry Commands," ISO/IEC FDIS 7816-8, Jun. 25, 1998, 33 Pages.
"Identification Cards—Integrated Circuit Cards—Part 8: Commands for Security Operations," ISO/IEC FDIS 7816-8: 2003 (E), Jul. 21, 2003, 23 Pages.
"Report of Changes to FDIS 7816-8," ISO/IEC 7816-8, Oct. 19, 1998, 4 Pages.
"Information Technology—Identification Cards—Integrated Circuit(s) Cards with Contacts—Part 9: Interindustry Commands for Card and File Management," ISO/IEC FCD 7816-9, Jan. 17, 2003, 15 Pages.
"Identification Cards—Integrated Circuit(s) Cards with Contacts—Part 9: Additional Interindustry Commands and Security Attributes," ISO/IEC FDIS 7816-9, Nov. 8, 1999, 34 Pages.
"Identification Cards—Integrated Circuit Cards with Contacts—Part 9: Commands for Card and File Management," ISO/IEC FDIS 7816-9: 20003 (E), Jul. 21, 2003, 17 Pages.
"Information Technology—Identification Cards—Integrated Circuit(s) Cards with Contacts—Part 11: Personal Verification Through Biometric Methods," ISO/IEC FCD 7816-11, Jul. 15, 2002, 36 Pages.
"Information Technology—Identification Cards—Integrated Circuit(s) Cards with Contacts—Part 13: Registration of Integrated Circuit Manufacturers," ISO/IEC CD 7816-13, Jan. 4, 2002, 7 Pages.
"Information Technology—Identification Cards—Integrated Circuit(s) Cards with Contacts—Part 15: Cryptographic Information Application," ISO/IEC FDIS 7816-15: 2003 (E), Feb. 12, 2003, 77 Pages.
European Search Report from EP Application No. EP20154505.0, dated Mar. 12, 2020.

* cited by examiner

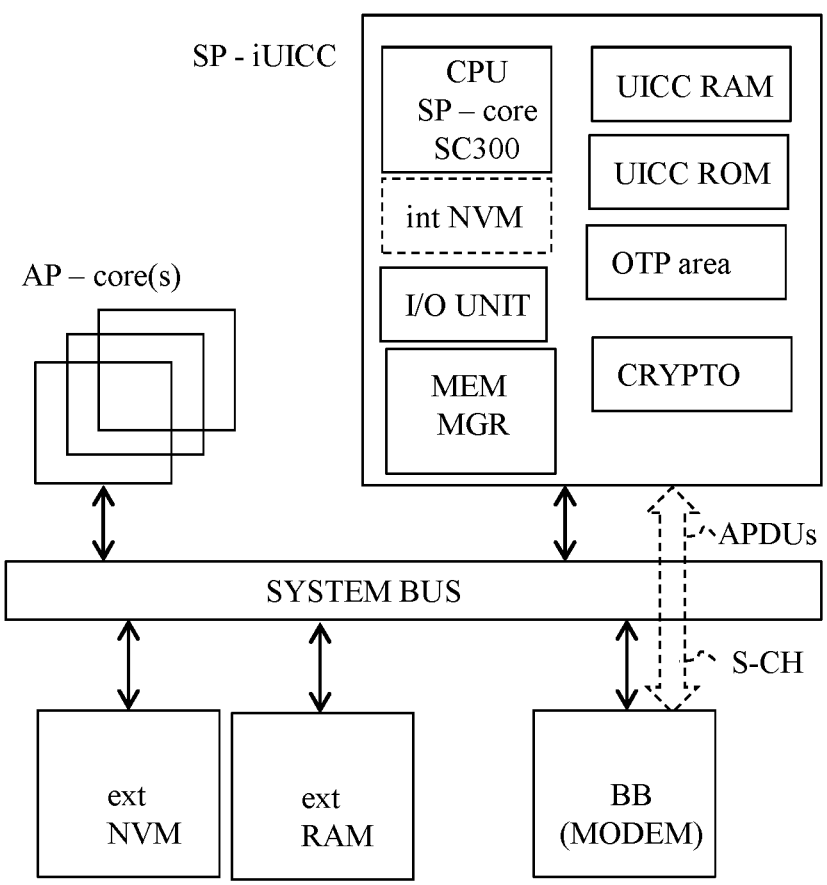

IMEI STORAGE

FIELD OF THE INVENTION

The invention relates to a chip set for a mobile-communication capable terminal with a terminal serial number IMEI that is assigned to the terminal and stored in the terminal, and a terminal.

BACKGROUND

The world is networked in mobile manner, and mobile networking progresses further. Mobile-communication capable terminals communicate via mobile communication networks. Classical mobile-communication capable terminals include mobile terminals such as smart phones and mobile telephones and mobile-communication capable tablets. Mobile-communication capable terminals further include regulation devices (control devices or measuring devices or combined control/measuring devices) for industrial facilities in commercial or private environments. Industrial facilities are for example production plants, which have one or several regulation devices (terminals) which can communicate with a background system or/and with each other via a mobile communication network. Other industrial facilities are smart home equipment such as heaters or electricity consumers with terminals in the form of regulation devices.

The IMEI, written out International Mobile Station Equipment Identity, is a unique 15-digit terminal serial number, on the basis of which each mobile terminal can be uniquely identified worldwide in the GSM or UMTS system and successors thereof. Dual-SIM mobile telephones have two IMEI numbers.

The IMEI of a mobile telephone can be queried in the input field of the telephone number by the input *#06# standardized in the GSM system. This query option is desired. According to GSM, it is provided that an IMEI is unique and protected against tampering by the user, for example forgery or change. Thus, [1] ETSI TS 122 016, chapter 2 "General", page 5, stipulates: "The IMEI shall not be changed after the ME's final production process. It shall resist tampering, i.e. manipulation and change, by any means (e.g. physical, electrical and software)." Practice shows, however, that tampering of the IMEI is possible in many mobile telephones which have been present on the market since 2002.

For the use of a mobile-communication capable terminal, such as a smart phone, mobile telephone, in a mobile communication network of a network operator, the terminal contains a subscriber identity module having a subscription profile or briefly profile. The profile achieves the configuration of the terminal and of the connection of the terminal in the mobile communication network. The profile is formed by a structured data set allowing the establishment, operation and breaking of a connection of the terminal in the mobile communication network, and comprises for example a cryptographic authentication key Ki and an International Mobile Subscriber Identity WISE The terminal itself has a chip set with one or several terminal chips for operating functions of the terminal. Current (and older) smart phones typically have, for example, a chip set that comprises at least three terminal chips, namely a transceiver IC which carries out the physical radio communication, a baseband processor BB (or synonymous modem) which carries out functions for data transmission via radio communication at the protocol level, and an application processor AP on which the operating system and application software, for example applications (e.g. apps) are executed. Transceiver ICs for other radio channels can be provided as further terminal chips, in particular for short-range radio channels such as NFC (NFC: near field communication) or Bluetooth.

The subscriber identity module can conventionally be integrated into carriers of different form factors, in particular plug-in and embedded carriers. Subscriber identity modules in carriers of the form factor plug-in (e.g. classical SIM card) and embedded (module provided for soldering into a terminal) are arranged on a dedicated chip of their own or SoC (System-on-Chip).

A newer concept for the form factor of a subscriber identity module are integrated subscriber identity modules, which are integrated on a terminal chip or SoC (System-on-Chip) of the terminal, thus have no chip of their own. Integrated subscriber identity modules are provided with the addendum "integrated" or "i" and are referred to, for example, as an integrated UICC, iUICC, iSIM or iUSIM.

SUMMARY OF THE INVENTION

The invention is based on the object of specifying a chip set for a mobile-communication capable terminal, in which the terminal serial number IMEI assigned to the terminal can be stored in as tamper-proof manner as possible, and a corresponding terminal.

The object is achieved by a chip set according to claim 1 and a terminal according to claim 15. Advantageous embodiments of the invention are specified in the dependent claims.

The chip set according to the invention according to claim 1 is provided for a terminal as defined at the outset, for example for a smart phone or mobile telephone or a regulation device in the industrial environment. The chip set comprising at least one secure processor into which a one-time programmable memory is integrated. At least one terminal serial number, for example the IMEI, of the terminal, is stored in the chip set. The method is characterized in that information for securing the terminal serial number against tampering is stored in the one-time programmable memory.

The solution according to claim 1 has the advantage that the one-time programmable memory is programmed once during the production of the chip set and can no longer be modified later. This ensures that the information for securing the terminal serial number remains programmed as done upon production and cannot be tampered with later. Consequently, the terminal serial number is secured against tampering via the security information.

According to claim 1, a chip set is thus created in which the terminal serial number is secured against tampering.

A mobile-communication capable terminal according to the invention comprises a chip set according to the invention According to one embodiment of the invention, an access to the information for securing the terminal serial number stored in the one-time programmable memory or/and to the terminal serial number is possible exclusively by the secure processor.

According to further embodiments of the invention, the chip set comprises at least one further processor, in particular an application processor or/and a baseband processor or/and one or several further processors, wherein an access to the information for securing the terminal serial number stored in the one-time programmable memory or/and to the terminal serial number itself is not possible by the at least one further processor.

In comparison to other processor cores of the chip set, such as e.g. a baseband processor or an application processor or an interface (NFC, Bluetooth, WLAN, etc.) processor, the secure processor usually has a higher security level. It is therefore preferred to permit the security-critical access to the information for securing the terminal serial number or/and to the terminal serial number itself exclusively to the secure processor.

More precisely, the chip set optionally comprises as the further processor a baseband processor (BB) which is set up for the protocol level of a mobile communication connection between the chip set and a server outside the chip set. In this embodiment of the invention, the secure processor and the baseband processor are set up to establish and operate a secure channel between the secure processor and the baseband processor, so that messages sent from the server to the chip set via the radio connection, in particular messages comprising updated terminal serial numbers, can be accepted by the baseband processor and can be forwarded to the secure processor via the secure channel. Further, also update data for subscription profiles for integrated subscriber identity modules of the chip set or update data for operating systems of the chip set can be securely transmitted between the baseband processor and the secure processor via the secure channel.

According to further embodiments of the invention, in the chip set at least two, or more, terminal serial numbers of the terminal are stored at the same time, wherein at least two, or more, terminal serial numbers are assigned to at least two different components of the chip set. In particular, different processors of the chip set can be provided as components. Further, different (integrated) subscriber identity modules or different subscription profiles or different operating systems of the chip set can be provided as components. In this case, each different (integrated) subscriber identity module and/or each different subscription profile and/or each different operating system has its own assigned terminal serial number (e.g. IMEI).

According to a first embodiment variant of the invention, in order to ensure tamper resistance, the information stored in the one-time programmable memory comprises the terminal serial number itself, or it consists exactly of the terminal serial number itself. In this case, the terminal serial number can be stored only once, for example during the production process of the chip set, and can no longer be changed subsequently and is thus directly secured against tampering.

According to a second embodiment variant of the invention, in order to ensure tamper resistance, the information stored in the one-time programmable memory does not directly comprise the terminal serial number, but a key with which the terminal serial number is secured. The terminal serial number is stored in a different memory, which does not need to be a one-time programmable memory and, according to one embodiment, is even deliberately a rewritable memory. The key, and thus the securing of the terminal serial number, in turn is arranged according to one of two variants. According to a first variant, the key is an encryption key for encrypting the terminal serial number. According to a second variant, the key is a security key, from which an encryption key for encrypting the terminal serial number can only be derived. In both cases, the terminal serial number is encrypted with the encryption key. In the first case, the encryption key is stored directly in the OTP. In the second case, the encryption key can only be derived from the security key stored in the OTP. In the second embodiment variant, the chip set further comprises, in the case of any variant of keys, an encryption device which is set up to encrypt the terminal serial number with the encryption key to form an encrypted terminal serial number, and to store the encrypted terminal serial number in the chip set in a memory provided for this purpose.

According to embodiments of the invention, a non-volatile memory, which is deliberately rewritable according to some embodiments, is coupled or can be coupled to the secure processor, wherein the encryption device is set up to store the encrypted terminal serial number into the non-volatile memory.

In the second embodiment variant, the terminal serial number is indirectly secured against tampering, in that the information for securing the terminal serial number can be stored only once, for example during the production process of the chip set, and can no longer be changed afterwards. The terminal serial number itself is stored in a non-volatile memory in the second embodiment variant, in a form which is secured by means of the information for securing, for example in a form encrypted with the encryption key as an encrypted terminal serial number. In the embodiments in which the secured (e.g. encrypted) terminal serial number is stored in a non-volatile memory which is rewritable, it is possible for an authorized entity, which has access to the security information, to update the terminal serial number. The protection of the terminal serial number against unauthorized tampering is ensured at the same time via the security information in the one-time programmable memory OTP.

According to an alternative, the non-volatile memory is arranged as an external memory (external since not provided directly on the chip area of the secure processor) of the chip set disposed outside the secure processor, and within the chip set, and is coupled or can be coupled to the secure processor via a system bus of the chip set. According to a further alternative, the non-volatile memory is arranged as an integrated internal memory disposed within the secure processor, which is integrated on the chip technology level on the chip area of the secure processor.

Optionally, the chip set contains an integrated subscriber identity module iUICC in which a subscription profile is stored or implemented, or which is set up to store and implement a subscription profile.

A method according to the invention for updating the terminal serial number in a chip set according to the invention comprises the steps of:
b) in the chip set, receiving an updated terminal serial number which is provided for replacing the terminal serial number stored in the chip set, and supplying the updated terminal serial number to the secure processor;
c) in the secure processor, in response to the receiving from step b), obtaining the encryption key by:
  either reading out the encryption key from the one-time programmable memory;
  or reading out the security key from the one-time programmable memory and subsequently deriving the encryption key from the security key;
d) encrypting the updated terminal serial number with the encryption key to form an encrypted updated terminal serial number;
e) storing the encrypted updated terminal serial number in the (rewritable) non-volatile memory.

The method optionally further comprises, before step b), the step a) of sending the updated terminal serial number from a server to the chip set, and accepting the sent updated terminal serial number by the chip set.

Optionally, the updated terminal serial number is sent to the chip set in an isolated step or method for updating the terminal serial number, which is exclusively or predominantly aimed at and relating to the updating of the terminal serial number.

Optionally, alternatively, the updating of the terminal serial number is integrated into a (first-time) transmission or an update of a subscription profile or of an operating system to the chip set. In this alternative approach, the chip set contains an integrated subscriber identity module, in which at least one subscription profile is stored, or which is set up for storing a subscription profile. In this case, the a) sending of the updated terminal serial number is effected as a part of a transmission of a subscription profile or of an operating system to the chip set, or as a part of a subscription update or operating system update for a subscription profile already present in the chip set. This approach has the advantage that a subscription profile and/or operating system and a terminal serial number employed in connection therewith are automatically kept consistent.

According to embodiments of the method, the chip set comprises a base band processor, and the supplying of the updated terminal serial number to the secure processor comprises a sending of the updated terminal serial number from the baseband processor to the secure processor via the secure channel between the baseband processor and the secure processor. The secure processor has security resources for the secure handling of terminal serial numbers, whereas the baseband processor does not or at least not necessarily. On the other hand, the baseband processor makes available to the chip set an interface to an OTA server, which keeps an updated terminal serial number ready for the chip set. In connection with mobile-communication capable terminals having a subscriber identity module, OTA (OTA=over the air) servers are set up to communicate with the subscriber identity module via a mobile communication connection. The secure processor itself has no interface to OTA servers. The secure channel between the baseband processor and the secure processor allows forwarding an updated terminal serial number which is received from the OTA server on the baseband processor to the secure processor in a secure manner within the chip set. The securing of the communication from the OTA server to the baseband processor is not the subject matter of this application, and can be effected using known means, for example.

The method optionally further comprises the step f) of rendering the stored terminal serial number unusable by deleting the stored encrypted terminal serial number, overwriting the encrypted terminal serial number with the updated encrypted terminal serial number or rendering unusable otherwise.

The method optionally further comprises, upon receiving an updated terminal serial number, an authentication or/and verification of a counter. The authentication is an authentication of the server vis-à-vis the chip set by means of one or several authentication keys(s) deposited in the one-time programmable memory. The verification is a verification of a counter information item received together with the updated terminal serial number with respect to a reference counter information item stored in the one-time programmable memory, in order to cause the storing of the updated terminal serial number to be permitted only at most, if a number of updates of the terminal serial number determined by the reference counter information has not yet been exceeded.

BRIEF DESCRIPTION OF THE DRAWINGS

In the following the invention will be explained in more detail on the basis of embodiment examples and with reference to the drawing, in which there is shown:

FIG. 1 a schematic representation of a chip set according to an embodiment of the invention.

DETAILED DESCRIPTION OF EMBODIMENT EXAMPLES

FIG. 1 shows, in a schematic representation, a chip set according to an embodiment of the invention. The chip set comprises the following components: a secure processor SP, a baseband core processor BB (a BB is partly also referred to as a modem), an application processor AP (having one or several, in this case several, processor cores, i.e. processor cores or CPUs), a memory chip having a rewritable non-volatile memory NVM disposed outside the secure processor SP, but within the chip set. The chip set is housed in a chip set package. The non-volatile memory NVM is provided in the example from FIG. 1 as an external memory ext NVM which is disposed within the chip package, but outside the secure processor SP (i.e. not located internally, directly on the chip of the secure processor SP), but alternatively can also be located entirely outside the chip package. In a further embodiment, which is represented in dashed manner in FIG. 1., the non-volatile memory NVM is an internal memory int NVM of the secure processor SP, which is permanently assigned to the secure processor SP and is integrated into the chip of the secure processor SP, for example on the level of the integrated semiconductor production technology. The components are coupled to one another via a system bus in FIG. 1. Between the secure processor SP and the baseband core processor BB, from a physical perspective via the system bus, a secure channel S-CH is established, via which the secure processor SP and the baseband core processor BB can securely exchange data. The data are exchanged between the secure processor SP and the baseband core processor BB in the secure channel S-CH at the protocol level as APDU commands according to the currently widely used standard ISO 7816. Alternatively, the data are exchanged in a format different from the ISO 7816 APDU format. The secure channel S-CH is set up by authentication and key agreement and is operated by subsequent encrypted exchange of data.

The secure processor SP comprises an SP core (i.e. a CPU), a one-time programmable memory OTP area, a read-only memory UICC ROM, an exclusive working memory UICC RAM of the secure processor SP, a crypto unit CRYPTO, a memory management Mem Mgr and an interface unit I/O Unit. As mentioned, on the chip area of the secure processor SP there can further be contained, in addition to the one-time writable memory OTP, a rewritable non-volatile memory NVM, as indicated by dashed lines. The memory management Mem Mgr, the crypto unit CRYPTO and the interface unit I/O Unit are set up in interaction with one another, to set up and operate the secure channel S-CH between the secure processor SP and the baseband core processor BB by means of authentication and encryption. An integrated subscriber identity module iUICC is set up in the secure processor SP. The read-only memory UICC ROM and the working memory UICC RAM are specifically provided for integrated subscriber identity modules iUICC on the secure processor SP. The chip set further has a general working memory RAM, represented here as an external working memory ext RAM, which is located outside the secure processor SP and is available to the other processor cores as a working memory.

In the one-time programmable memory OTP area, keys are stored for authentication and encryption for setting up and operating the secure channel S-CH. Further, in the one-time programmable memory OTP area, according to a first alternative of the invention, the terminal serial number IMEI is stored. In the case of several IMEIs, the several terminal serial numbers IMEI, IMEI, IMEI", . . . are stored. The terminal serial number(s) IMEI is (are) stored either in plain text or in encrypted form as enc(IMEI) in the one-time programmable memory OTP area. According to a second alternative of the invention the terminal serial number(s) IMEI, IMEI', IMEI" . . . is (are) stored in the (external or internal) rewritable non-volatile memory NVM (ext NVM or int NVM), above all in the case of ext NVM obligatorily in encrypted form as enc(IMEI), encrypted with an encryption key. The encryption key or a security key, from which the encryption key can be derived, is stored in the one-time programmable memory OTP area in this second variant.

A mechanism is desirable for the concept of an integrated iUICC and of an eUICC, in which, in addition to the profile data, the complete operating system can optionally also be exchanged remotely, since the SIM card cannot readily be exchanged physically. This mechanism is also referred to as eSIM management. Since in the course of the life cycle of the hardware (of the chip set) the subscriptions, operating systems and network operators can theoretically change as often as desired, it is preferred to deposit the IMEI for the respective subscription in a rewritable non-volatile memory. It is likewise possible, when a sufficiently large rewritable non-volatile memory is provided, that several profiles or operating systems or several iUICCs are present in parallel on the chip set. Therefore, in favor of simpler assignability between the IMEI and the profile/operating system, it is advantageous to manage the IMEI as a part of the subscription update via the remote management system together with the profile/operating system OS of the iUICC or eUICC. Thus, in the case of the change of the operating system or of the profile or in the case of application of different subscriptions active in parallel (optionally of different network operators) it is possible to transmit the IMEI to the device either as an integral part of the subscription (e.g. in a dedicated elementary file in the UICC data structure) or as a separate data content, but in the same updating process. This ensures that a dedicated IMEI is always assigned to the respectively valid and executed subscription.

CITED PRIOR ART

[1]. ETSI TS 122 016, Digital cellular telecommunications system (Phase 2+); Universal Mobile Telecommunications System (UNITS); LTE; International Mobile Equipment Identities (IMEI); 3 GPP TS 22.016 version 10.0.0 Release 10.

The invention claimed is:

1. A chip set for a terminal, the chip set comprising:
at least one secure processor into which a one-time programmable memory is integrated; and
a baseband processor that makes an interface to a server available to the chip set through a transceiver of the terminal, the server being outside the chip set and the server being arranged to communicate with the chip set via a mobile communication network;
wherein at least one International Mobile Station Equipment Identity (IMEI) terminal serial number of the terminal is stored in the chip set,
wherein the secure processor and the baseband processor are configured to establish and to operate a secure channel between the secure processor and the baseband processor such that a message comprising an updated IMEI terminal serial number (IMEI*) can be accepted by the baseband processor and forwarded to the secure processor via the secure channel, and
wherein in the one-time programmable memory information is stored that secures the at least one IMEI terminal serial number serial against tampering.

2. The chip set according to claim 1, wherein an access to the information that secures the IMEI terminal serial number stored in the one-time programmable memory or/and to the IMEI terminal serial number is possible exclusively by the secure processor.

3. The chip set according to claim 2, comprising an application processor and/or one or several further processors, and wherein an access to the information that secures the IMEI terminal serial number stored in the one-time programmable memory or/and to the IMEI terminal serial number is not possible by the baseband processor, the application processor, or the one or several further processors.

4. The chip set according to claim 1, wherein the baseband processor is configured for a radio connection between the chip set and a server outside the chip set.

5. The chip set according to claim 1, wherein in the chip set at least two, or more, IMEI terminal serial numbers (IMEI, IMEI', IMEI", . . . ) of the terminal are stored at the same time, wherein at least two, or more, IMEI terminal serial numbers (IMEI, IMEI', IMEI", . . . ) are assigned to at least two different components of the chip set.

6. The chip set according to claim 1, wherein the information stored in the one-time programmable memory comprises the IMEI terminal serial number or consists of the IMEI terminal serial number.

7. The chip set according to claim 1, wherein the information stored in the one-time programmable memory comprises a key which is arranged:
as an encryption key for encrypting the IMEI terminal serial number, or
as a security key, from which an encryption key for encrypting the IMEI terminal serial number can be derived; and
wherein the chip set further comprises an encryption device which is configured to encrypt the IMEI terminal serial number with the encryption key to form an encrypted IMEI terminal serial number (enc(IMEI)) and to store the encrypted IMEI terminal serial number (enc(IMEI)) in the chip set.

8. The chip set according to claim 7, wherein a non-volatile memory is coupled or can be coupled to the secure processor, and
wherein the encryption device is configured to store the encrypted IMEI terminal serial number (enc(IMEI)) into the non-volatile memory.

9. The chip set according to claim 8, wherein the non-volatile memory is arranged either as an external memory of the chip set disposed outside the secure processor and is coupled or can be coupled to the secure processor via a system bus of the chip set or, alternatively, is arranged as an internal memory disposed within the secure processor and integrated on the chip level on the chip of the secure processor.

10. The chip set according to claim 1, wherein the chip set contains an integrated subscriber identity module in which a subscription profile is stored, or which is configured to store a subscription profile.

11. The chip set according to claim 10, wherein the integrated subscriber identity module is an integrated universal integrated circuit card (iUICC) in which the subscription profile is stored, or which is configured to store the subscription profile.

12. A mobile-communication capable terminal comprising a chip set according to claim 1.

13. The chip set according to claim 1, wherein the secure processor and the baseband processor are configured to set up the secure channel between the secure processor and the baseband processor by authentication and/or key agreement, and/or are configured to operate the secure channel by encrypted exchange of data.

14. A method for updating an International Mobile Station Equipment Identity (IMEI) terminal serial number in a chip set for a terminal, the chip set comprising at least one secure processor into which a one-time programmable memory is integrated, and a baseband processor that makes an interface to a server available to the chip set through a transceiver of the terminal, the server being outside the chip set and the server being arranged to communicate with the chip set via a mobile communication network, wherein at least one IMEI terminal serial number of the terminal is stored in the chip set, wherein the secure processor and the baseband processor are configured to establish and to operate a secure channel between the secure_processor and the baseband processor such that a message comprising an updated IMEI terminal serial number (IMEI*) can be accepted by the baseband processor and forwarded to the secure processor via the secure channel, and wherein in the one-time programmable memory information is stored that secures the at least one IMEI terminal serial number serial against tampering, the method comprising the steps of:
a) in the chip set, receiving an updated IMEI terminal serial number (IMEI*) which is provided for replacing the IMEI terminal serial number stored in the chip set, and supplying the updated IMEI terminal serial number (IMEI*) to the secure processor;
b) in the secure processor, in response to the receiving from step a), obtaining an encryption key for encrypting the IMEI terminal serial number by:
  either reading out the encryption key from the one-time programmable memory, or
  reading out the security key from the one-time programmable memory and subsequently deriving the encryption key from the security key;
c) encrypting the updated IMEI terminal serial number (IMEI*) with the encryption key to form an encrypted updated IMEI terminal serial number (enc (IMEI*)); and
d) storing the encrypted updated IMEI terminal serial number (enc(IMEI*)) in the non-volatile memory.

15. The method according to claim 14, further comprising, before step a), the step of:
sending the updated IMEI terminal serial number (IMEI*) from a server to the chip set.

16. The method according to claim 15, wherein the chip set contains an integrated subscriber identity module in which at least one subscription profile is stored or implemented, or which is configured to store or implementing a subscription profile, and wherein the sending of the updated IMEI terminal serial number (IMEI*) is effected as a part of a transmission of a subscription profile or of an operating system to the chip set, or as a part of a subscription update or an operating system update for a subscription profile.

17. The method according to claim 16, wherein the integrated subscriber identity module is an integrated universal integrated circuit card (iUICC) in which at least one subscription profile is stored or implemented, or which is configured to store or implementing the subscription profile.

18. The method according to claim 14, further comprising the step of:
e) rendering the stored IMEI terminal serial number unusable by deleting the stored encrypted IMEI terminal serial number (enc(IMEI)), overwriting the encrypted IMEI terminal serial number (enc(IMEI)) with the updated encrypted IMEI terminal serial number (enc(IMEI*)) or rendering unusable otherwise.

19. The method according to claim 14, further comprising, upon receiving an updated IMEI terminal serial number (IMEI*):
authentication of the server vis-a-vis the chip set by means of one or several authentication keys or keys deposited in the one-time programmable memory or/and
verification of a counter information item received together with the updated IMEI terminal serial number (IMEI*) with respect to a reference counter information item stored in the one-time programmable memory, in order to cause the storing of the updated IMEI terminal serial number (IMEI*) to be permitted only at most, if a number of updates of the IMEI terminal serial number determined by the reference counter information has not yet been exceeded.

20. A chip set for a terminal, the chip set comprising:
at least one secure processor into which a one-time programmable memory is integrated; and
a baseband processor that makes an interface to a server available to the chip set through a transceiver of the terminal, the server being outside the chip set and the server being arranged to communicate with the chip set via a mobile communication network;
wherein at least one terminal serial number of the terminal is stored in the chip set,
wherein the secure processor and the baseband processor are configured to establish and to operate a secure channel between the secure processor and the baseband processor such that a message comprising an updated terminal serial number can be accepted by the baseband processor and forwarded to the secure processor via the secure channel, and
wherein in the one-time programmable memory information is stored that secures the at least one terminal serial number serial against tampering.

* * * * *